United States Patent
Maier et al.

(10) Patent No.: US 8,831,792 B2
(45) Date of Patent: Sep. 9, 2014

(54) REDUNDANT ADAPTIVE ALGORITHM FOR ELECTRICAL PRESSURE REGULATED HIGH PRESSURE TANK SYSTEMS

(75) Inventors: Oliver Maier, Worms (DE); Thomas Weispfenning, Ober-Ramstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 508 days.

(21) Appl. No.: 13/171,064

(22) Filed: Jun. 28, 2011

(65) Prior Publication Data
US 2013/0000742 A1    Jan. 3, 2013

(51) Int. Cl.
  *G05D 16/00*    (2006.01)
  *G05D 16/20*    (2006.01)
  *H01M 8/04*    (2006.01)

(52) U.S. Cl.
  CPC ....... *H01M 8/04089* (2013.01); *G05D 16/2013* (2013.01); *Y02E 60/50* (2013.01); *H01M 8/04201* (2013.01); *H01M 8/04208* (2013.01); *Y02E 60/321* (2013.01)
  USPC .......................................... 700/301; 700/282

(58) Field of Classification Search
  USPC ...................... 137/14, 557; 700/282, 301, 306
  See application file for complete search history.

(56) References Cited

U.S. PATENT DOCUMENTS

2010/0273081 A1 *    10/2010    Ishikawa ....................... 429/443

* cited by examiner

*Primary Examiner* — Carlos Ortiz Rodriguez
(74) *Attorney, Agent, or Firm* — John A. Miller; Miller IP Group, PLC

(57) ABSTRACT

A method and system for controlling a pressure regulator in a gas storage system using a pressure switch as a pressure measurement device. A controller uses supply pressure data and gas flow demand data to compute a feed-forward control term, and uses data from a pressure sensor downstream of the pressure regulator to compute a feedback control term. During normal operation, with pressure downstream of the regulator oscillating about a set point pressure, on-time and off-time periods of a pressure switch are monitored, and an adaptive control term is computed which balances on-time and off-time. If the pressure sensor fails, excessive switch on-time or off-time will be detected; in response to this, the feedback control term is disregarded, and an adaptive control term is computed which aims to restore balanced on-time and off-time of the switch, thus indicating that the actual pressure is oscillating about the set point.

19 Claims, 4 Drawing Sheets

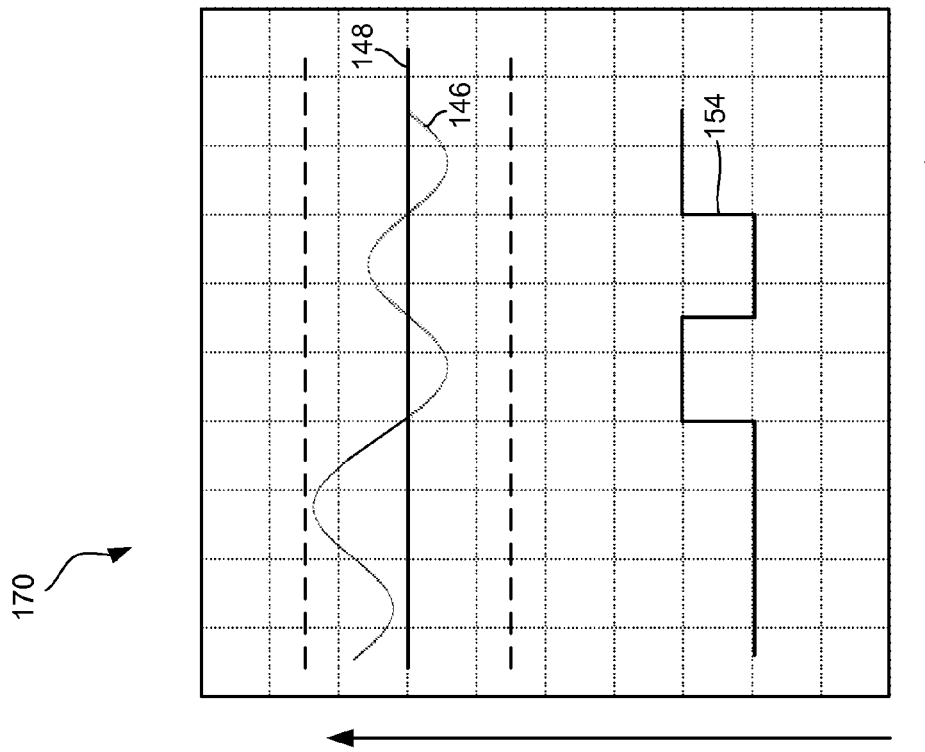
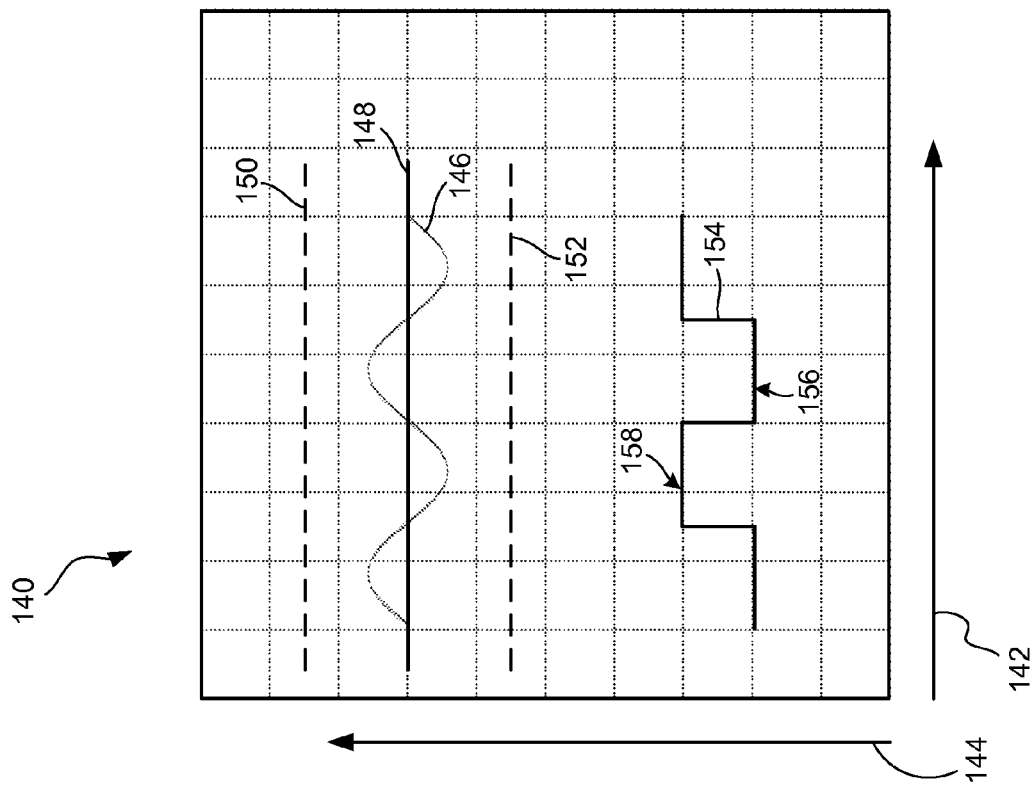
FIGURE 2B
FIGURE 2A

REDUNDANT ADAPTIVE ALGORITHM FOR ELECTRICAL PRESSURE REGULATED HIGH PRESSURE TANK SYSTEMS

BACKGROUND OF THE INVENTION

1. Field of the Invention

This invention relates generally to pressure measurement in a gas storage system and, more particularly, to a method and mechanization which replaces one of two redundant pressure sensors in a gas storage system with a pressure switch, uses an adaptive algorithm to monitor the on-off cycling of the pressure switch in comparison to a signal from the remaining pressure sensor, and ensures that output from a regulator in the gas storage system is within an expected range of pressure.

2. Discussion of the Related Art

Fuel cell vehicles are expected to increase in popularity in the automotive marketplace. Fuel cell vehicles offer several desirable features, such as virtually pollution-free emissions, and avoiding vehicle usage of petroleum fuels. A key component of fuel cell vehicles is the hydrogen storage system, which stores the hydrogen gas used as a fuel by most fuel cell vehicles. Hydrogen storage systems typically consist of one or more interconnected pressure vessels for storing gaseous hydrogen, along with numerous valves, gauges, and fittings necessary for operation of the hydrogen storage system.

Fuel cells require a reliable source of hydrogen gas at a prescribed pressure. A pressure regulator is used to reduce the pressure of the hydrogen gas from the high pressure at which it is stored in the vessels to the lower pressure required by the fuel cell. In order to ensure that the pressure regulator is working properly, it is necessary to measure the pressure at the outlet of the pressure regulator. For redundancy, two pressure sensors are typically used to measure the pressure of the hydrogen gas output from the regulator. While this arrangement provides the reliability and redundancy needed, the cost and complexity of using two pressure sensors, along with the associated wiring and controller connections, are significant.

It would be desirable to replace one of the pressure sensors downstream of the pressure regulator with a simpler and lower cost device. Such an implementation would not only lower the cost of the hydrogen storage system, it could also improve the reliability by simplifying assembly and eliminating wiring connections and other potential fault sources.

SUMMARY OF THE INVENTION

In accordance with the teachings of the present invention, a method and system are disclosed for controlling a pressure regulator in a gas storage system using a pressure switch as a second pressure measurement device. A controller uses supply pressure data and gas flow demand data to compute a feed-forward control term, and uses data from a pressure sensor downstream of the pressure regulator to compute a feedback control term. During normal operation, with pressure downstream of the regulator oscillating about a set point pressure, on-time and off-time periods of a pressure switch are monitored, and an adaptive control term is computed which aims to balance the on-time and off-time periods. In the event of a faulty pressure sensor feedback signal, excessive on-time or off-time of the switch will be detected. In response to the excessive on-time or off-time, the feedback control term is disregarded, and an adaptive control term is computed which aims to restore balanced on-time and off-time of the pressure switch, thus indicating that the actual pressure is oscillating about the set point pressure.

Additional features of the present invention will become apparent from the following description and appended claims, taken in conjunction with the accompanying drawings.

BRIEF DESCRIPTION OF THE DRAWINGS

FIG. 2A is a graph showing pressure conditions downstream of the pressure regulator in the hydrogen storage system during normal operation;

FIG. 2B is a graph showing pressure conditions downstream of the pressure regulator in the hydrogen storage system in a situation where the pressure sensor has experienced a fault;

DETAILED DESCRIPTION OF THE EMBODIMENTS

The following discussion of the embodiments of the invention directed to using a pressure switch in an adaptive method of controlling pressure in a gas storage system is merely exemplary in nature, and is in no way intended to limit the invention or its applications or uses. For example, much of the ensuing discussion is directed to hydrogen storage systems for automotive fuel cells, but the disclosed method and mechanization is equally applicable to any pressure-regulated gas storage system.

Fuel cells can be designed to use a variety of fuels, but the fuel cells being developed for most automotive applications use hydrogen gas as a fuel. Such fuel cells require a reliable source of hydrogen gas, typically provided by a hydrogen storage system.

Figure 1:
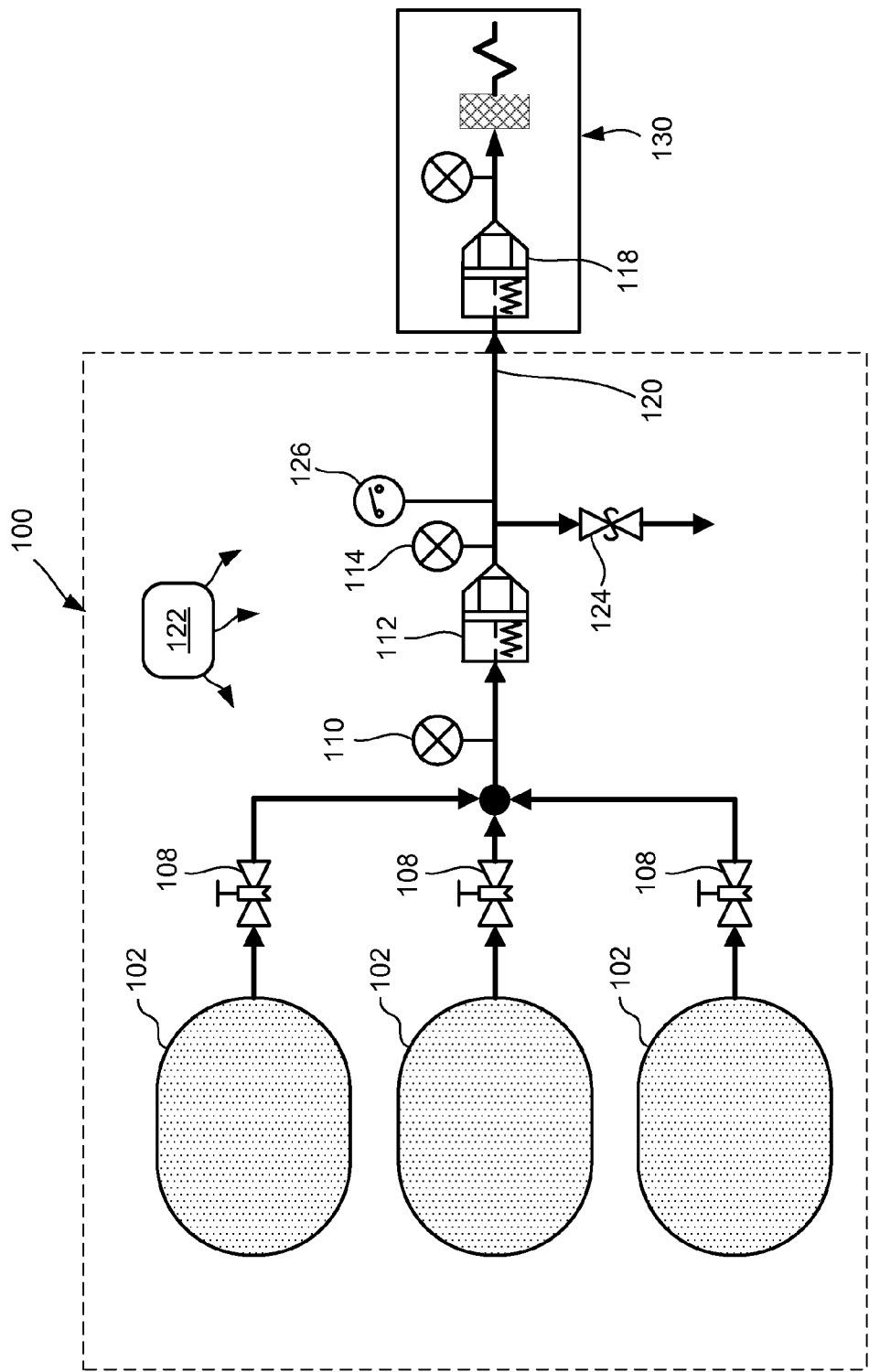
FIG. 1 is a schematic diagram of a hydrogen storage system for a fuel cell in which a pressure switch and a pressure sensor are used to adaptively control an electronic pressure regulator.

FIG. 1 is a schematic diagram of a hydrogen storage system 100 for a fuel cell 130. Pressure vessels 102 store hydrogen gas at a high pressure, in the range of 600-800 bar when the vessels 102 are full, for example. More or fewer of the pressure vessels 102 could be used than the three shown in the hydrogen storage system 100. A fill port (not shown) is used to fill the vessels 102 from an external supply. Shut-off valves 108 are situated just downstream from each of the pressure vessels 102. The terms upstream and downstream are used throughout this disclosure with respect to the direction of flow from the pressure vessels 102 to the fuel cell 130, where the pressure vessels 102 are upstream and the fuel cell 130 is downstream. A pressure sensor 110 measures the hydrogen pressure between the shut-off valves 108 and a pressure regulator 112. The pressure regulator 112 is used to reduce the pressure of the hydrogen gas from the high pressure of the vessels 102 down to a lower pressure which is near that required by the fuel cell 130.

A pressure sensor 114 measures the hydrogen pressure downstream of the regulator 112. A second pressure regulator 118, located in the fuel cell 130, is used to reduce the hydrogen gas pressure down to the low pressure, typically less than 3 bar, required by the fuel cell 130. A fuel supply line 120 connects the hydrogen storage system 100 to the fuel cell 130. A controller 122—in communication with the valves 108, the sensors 110 and 114, the regulators 112 and 118, and the fuel cell 130—can be used to monitor conditions in the hydrogen storage system 100 and the fuel cell 130, and control various operations within the hydrogen storage system 100, as will be discussed below. For simplicity, the details of the components of the fuel cell 130 are omitted, as are various filters, check valves, and other components of the hydrogen storage system 100.

In order to ensure that the pressure of the gas entering the pressure regulator 118 is not excessive, a pressure relief valve 124 may be used. The pressure relief valve 124 is designed to open if the pressure of the gas at its inlet (equivalent to the pressure at the inlet of the pressure regulator 118) is above a predetermined threshold, typically slightly higher than the expected inlet pressure at the regulator 118. As an example, the system 100 may be designed such that the pressure at the sensor 114 (outlet of the pressure regulator 112, and inlet of the pressure regulator 118) is about 10 bar. To provide an additional measure of redundancy, a second pressure sensor (not shown) downstream of the pressure regulator 112 is also often used. The second pressure sensor downstream of the regulator 112, if used, would provide a measurement of pressure at that point in the system 100, independent of the pressure sensor 114, to verify that conditions are as expected.

To avoid the added cost and complexity of a second pressure sensor downstream of the regulator 112, it is proposed that a pressure switch 126 be used in conjunction with the pressure sensor 114 to verify the gas pressure between the regulator 112 and the regulator 118, using a method that will be explained in detail below. The pressure switch 126 is of a typical design, where the switch 126 provides an "off" signal whenever the pressure it experiences is above a switch set point pressure, and the switch 126 provides an "on" signal whenever the pressure it experiences is below the switch set point pressure. The pressure switch 126 provides the on and off signals to the controller 122.

There are several reasons for using the pressure switch 126 instead of a second pressure sensor. First, the pressure switch 126 costs less than a pressure sensor. Second, installation of the pressure switch 126 is simpler than installation of a second pressure sensor, as the switch 126 requires fewer wires. Third, with the pressure switch 126, an analog-to-digital signal converter is not necessary at the controller 122. Finally, the simple on/off digital signal of the pressure switch 126 is less susceptible to electromagnetic interference (EMI) than is an analog signal from a pressure sensor.

As discussed above, the pressure regulator 112 must reduce the hydrogen gas pressure from an inlet pressure which may be as high as 600-800 bar down to an outlet pressure of about 10 bar. However, when the vessels 102 are nearly empty, the pressure at the inlet to the pressure regulator 112 may only be 30-40 bar. Thus, the pressure regulator 112 must provide a reliable outlet pressure under a wide range of inlet pressures. In order to meet this demanding requirement, the pressure regulator 112 may be an electronically-controlled model rather than a mechanical regulator. Electronically-controlled pressure regulators use pressure and flow data signals in an algorithm which defines control parameters for the regulator, in this case the pressure regulator 112.

To use the pressure switch 126 in place of a second pressure sensor in the system 100, an adaptive control algorithm for controlling the regulator 112 is required. In particular, the objective is to use the on/off cycling of the switch 126 as a pseudo-pressure reading, as will be discussed below.

FIG. 2A is a graph 140 showing pressure conditions downstream of the pressure regulator 112 in normal operation. On the graph 140, horizontal axis 142 represents time, and vertical axis 144 represents pressure and the logical on/off signal of the pressure switch 126. Curve 146 defines the actual pressure downstream of the pressure regulator 112, which matches the reading from the pressure sensor 114 as long as the pressure sensor 114 is working properly. The curve 146 oscillates about a pressure set point line 148, which could be at a value of 10 bar, as mentioned previously. The lines 150 and 152 represent the upper and lower allowable pressure limits, respectively, at the location downstream of the pressure regulator 112. The oscillation of the curve 146 above and below the pressure set point line 148 is due to the adjustment of the pressure regulator 112 by the controller 122, in response to the consumption of hydrogen gas by the fuel cell 130. This will be discussed in detail below.

Stepwise line 154 is actually not a pressure value or reading, but rather is the on/off signal from the pressure switch 126. The line 154 has an "off" value whenever the curve 146 is above the set point line 148, as shown at segment 156 of the line 154. Similarly, the line 154 has an "on" value whenever the curve 146 is below the set point line 148, as shown at segment 158 of the line 154. On the graph 140, which depicts a fairly steady state situation, where neither the pressure in the vessels 102 nor the demand for hydrogen by the fuel cell 130 changes rapidly, it can be seen that the each on cycle of the line 154 has about the same duration as each off cycle. This is by design, and is accomplished via the control method used in the controller 122, to be discussed below.

FIG. 2B is a graph 170 showing pressure conditions downstream of the pressure regulator 112 in a situation where the pressure sensor 114 has experienced a fault. On the graph 170, the curve 146 still represents the actual pressure downstream of the pressure regulator 112, and the line 154 still represents the on/off signal from the pressure switch 126. However, on the graph 170, the curve 146 is no longer the same as the reading from the pressure sensor 114. Consider that, in the situation shown on the graph 170, the pressure sensor 114 has experienced a fault of some sort and is sending an inaccurate reading. In this case, for example, the sensor 114 is reading too low, so the actual pressure (as shown by the curve 146) is higher than the set point pressure (indicated by the line 148). When this is detected (via an excessive off-time of the switch, as discussed below), the controller 122 adapts to ensure that the actual pressure is not allowed to remain too high.

In the situation described above, the additional feedback provided by the pressure switch 126 can be used by the controller 122 to compensate for the inaccurate reading from the sensor 114, and bring the actual pressure back to the set point. It can be observed that the "off" time of the line 154 is excessive at the left side of the graph 170. This is because the actual pressure downstream of the pressure regulator 112 is above the set point line 148, as shown by the curve 146. When the controller 122 detects that the switch 126 stays off for longer than expected, given the vessel pressure and fuel cell flow rate conditions, the controller 122 can determine that the reading from the sensor 114 must be inaccurate. At that point, the controller 122 would reduce the flow through the pressure regulator 112, causing the actual pressure to drop until the switch 126 turns on, at which time the controller 122 would resume the operation of the pressure regulator 112 according to the duty cycle which was used prior to the fault in the sensor 114. Once the controller 122 disregards the signal from the sensor 114, the curve 146 returns to normal oscillation about the set point line 148, and the line 154 returns to equal on/off cycle times, as seen toward the right side of the graph 170.

The controller 122 can also directly detect a hard fault in the pressure sensor 114, such as a short to ground or a short to voltage. In a situation where the pressure sensor 114 is known to be faulty, or no signal at all is available from the sensor 114, the controller 122 disregards that source of input, uses the feed-forward control path to control the operation of the pressure regulator 112, and adapts as necessary to balance on-time and off-time periods.

Figure 3:
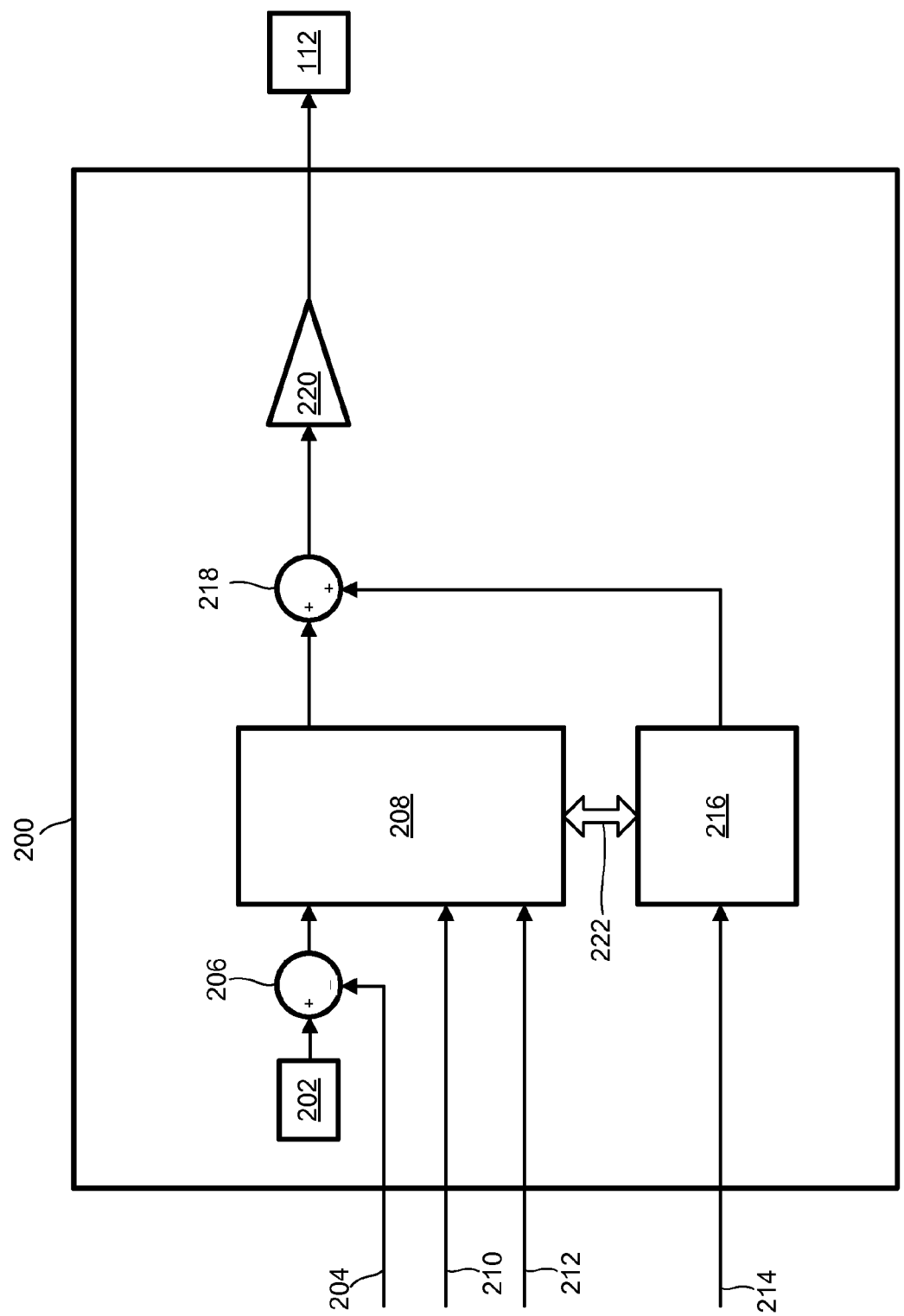
FIG. 3 is a block diagram of a control module which can be used in a controller to control the electronic pressure regulator in the hydrogen storage system.

FIG. 3 is a block diagram of a control module 200 which can be used in the controller 122 to electronically control the pressure regulator 112. The control module 200 is described here as being only part of the controller 122, as the controller 122 can be used for other purposes, such as monitoring pressure in the vessels 102, closing the shut-off valves 108 if necessary, etc. The set point pressure is provided at box 202. The set point pressure is the target output pressure from the pressure regulator 112, such as 10 bar, for example. The signal from the pressure sensor 114 is provided on line 204 to summing junction 206, where it is subtracted from the set point pressure from the box 202. A pressure error signal from the summing junction 206 is provided to a feed-forward/feedback control module 208.

The feed-forward/feedback control module 208 uses traditional feed-forward and feedback control methods to control the operation of the pressure regulator 112. The pressure error signal from the summing junction 206 is used for the feedback control term. The feed-forward control term is established based on the pressure in the vessels 102, provided by a signal from the pressure sensor 110 on line 210, and the demand for hydrogen gas from the fuel cell 130 via a signal on line 212. The hydrogen demand could be determined from a mass or volume flow rate measured at the fuel supply line 120, or from a model-based hydrogen flow estimation. Knowing the pressure of the gas upstream of the pressure regulator 112 and the flow rate of gas into the fuel cell 130, the feed-forward/feedback control module 208 can use a look-up table to determine the nominal setting of the pressure regulator 112 which will meet the demand. This nominal setting is the feed-forward term, which is adjusted by the feedback term described earlier.

The on/off signal from the pressure switch 126 is provided on line 214 to an adaptation control module 216. The adaptation control module 216 performs several functions in the control of the pressure regulator 112. First, during normal operation, the adaptation control module 216 monitors on-time and off-time periods of the switch 126, with the objective of balancing on-time and off-time. For example, if the adaptation control module 216 determines that off-time periods are longer than on-time periods, the module 216 provides a signal to summing junction 218 to reduce the pressure, in an effort to balance on-time periods and off-time periods as shown on FIG. 2A. The output of the summing junction 218 is passed through an amplifier 220, and this signal is used to control the pressure regulator 112.

A second function of the adaptation control module 216 is to detect a potential fault in the pressure sensor 114. As discussed previously, under steady state conditions, where the supply pressure on the line 210 and the hydrogen demand on the line 212 are not changing significantly, the control module 200 should have established operational control of the pressure regulator 112 whereby the on-time and off-time periods of the switch 126 are balanced. If, under these steady state conditions, an excessively long on-time or off-time period is detected, the adaptation control module 216 can provide notification to the feed-forward/feedback control module 208 on channel 222 that the pressure sensor 114 has likely experienced a fault. A predetermined threshold can be used to identify the excessively long on-time or off-time period. The predetermined threshold can be defined in absolute terms, such as a certain number of seconds, or it can be defined relative to the recent nominal on-time and off-time periods, such as 200% or twice as long. These threshold values are merely exemplary; the threshold can be selected to optimize performance.

In the situation where an off-time period exceeds the threshold, thus indicating that the actual pressure is remaining above the set point pressure, the feed-forward/feedback control module 208 can be configured to disregard the pressure error signal from the summing junction 206. The feed-forward/feedback control module 208 would then use only the feed-forward term for control of the pressure regulator 112, which would be adjusted at the summing junction 218 by the signal from the adaptation control module 216, which would initially need to compensate for the excessively long off-time period. The hydrogen storage system 100 could continue to operate in this mode, although it would be less responsive to transients due to the lack of feedback control based on the pressure sensor 114. A diagnostic trouble code (DTC) would be set in the controller 122 or another controller in the vehicle, so that the owner would have the vehicle serviced to replace any faulty components or repair any faulty connections.

If the pressure switch 126 fails, or the signal from the switch 126 on the line 214 is compromised, the adaptation control module 216 would inform the feed-forward/feedback control module 208 of this on the channel 122. This could be detected by a constant on or off signal, or a lack of a signal altogether. In this situation, the adaptation control module 216 would not send a control correction signal to the summing junction 218, and control would be established by the feed-forward/feedback control module 208 alone. Again, a DTC would be set, so that the vehicle could be serviced and repairs or replacements performed as necessary.

Even if the pressure switch 126 fails or its signal is compromised, the adaptation control module 216 could perform one other specialized function. It is possible for the control module 200 to detect venting at the pressure relief valve 124, as another type of indication that the signal from the pressure sensor 114 is inaccurate. This could be done by the feed-forward/feedback control module 208 detecting a clipped or flat top on the normally sinusoidal signal from the pressure sensor 114. If venting of the pressure relief valve 124 is detected, the adaptation control module 216 could send an adaptive command to the summing junction 218 which reduces the opening of the pressure regulator 112, thus dropping the pressure downstream of the regulator 112 until the venting condition is eliminated. This can be done even if the pressure switch 126 or its signal are faulty and being disregarded.

Figure 4:
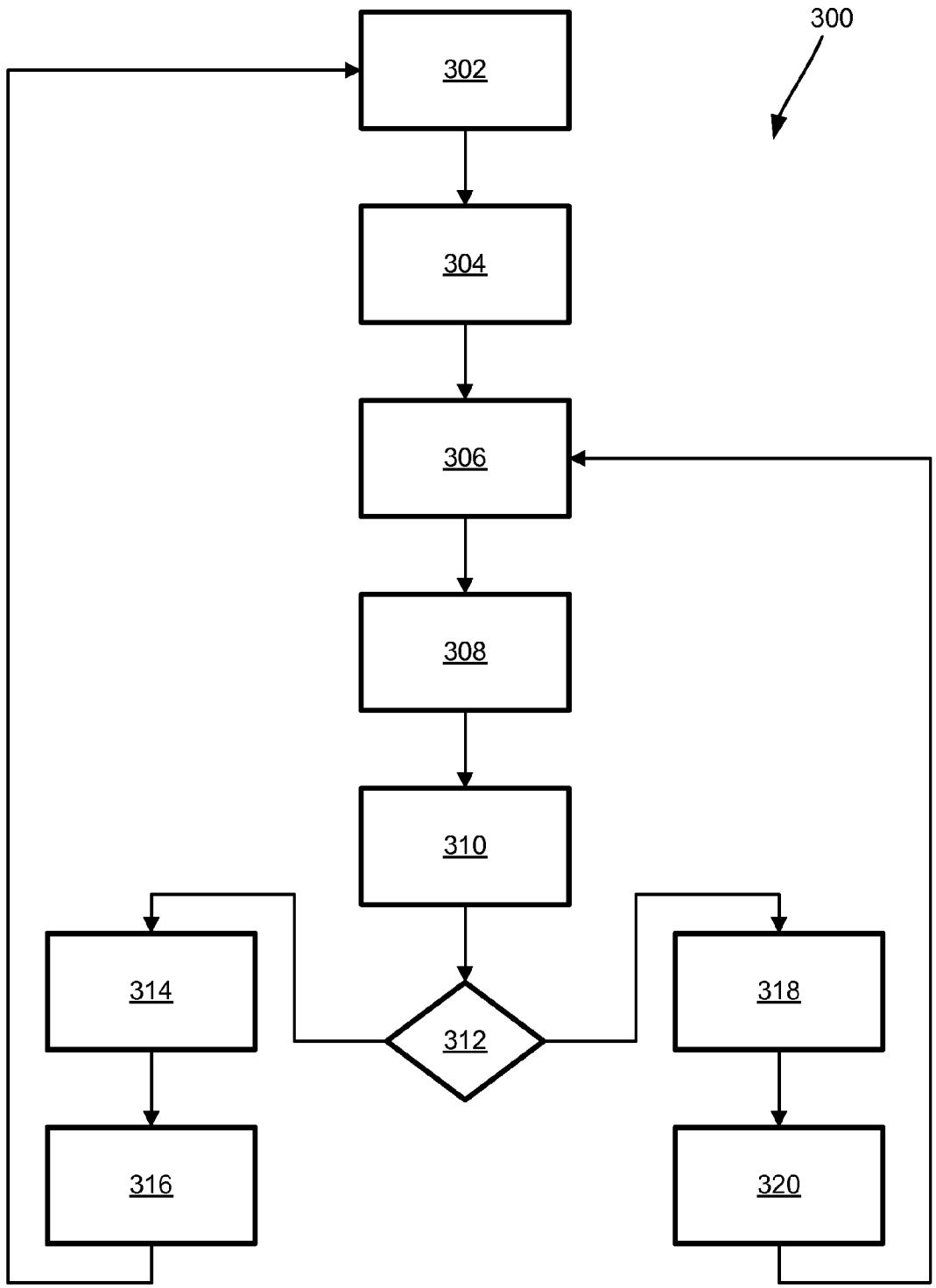
FIG. 4 is a flow chart diagram of a method for adaptively controlling the electronic pressure regulator using signals from the pressure sensor and the pressure switch.

FIG. 4 is a flow chart diagram 300 of a method for adaptively controlling the pressure regulator 112 using signals from the pressure sensor 114 and the pressure switch 126. At box 302, the pressure downstream of the pressure regulator 112 is measured by the pressure sensor 114. At box 304, the measured pressure from the box 302 is compared to a set point pressure, and the difference is used to compute a feedback control term. At box 306, the supply pressure, or pressure upstream of the pressure regulator 112 is measured, along with a gas flow demand. At box 308, a feed-forward control term is determined based upon the supply pressure and the gas flow demand. At box 310, on-time and off-time periods are evaluated using a signal from the pressure switch 126.

At decision diamond 312, a determination is made whether an excessively lengthy on-time or off-time period has been experienced, or if a fault in the signal from the pressure sensor 114 has been detected. If no excessive on-time or off-time period has been experienced, and no pressure sensor fault has been detected, then the process moves from the decision diamond 312 to box 314, where an adaptation control term is computed based on any difference between recent on-time periods and off-time periods. As discussed above, the adaptation control term is intended to balance on-time and off-time periods. At box 316, the feedback, feed-forward and adaptation control terms are combined and used to control the pressure regulator 112. The process then loops back to the box 302 for a subsequent pressure reading.

If, at the decision diamond 312, an excessive off-time period has been experienced or a hard fault of the pressure sensor 114 has been detected, then the process moves from the decision diamond 312 to box 318. At the box 318, an adaptation control term is computed which counteracts any excessive off-time period. As discussed above, the adaptation control term in this case is intended to bring the actual pressure downstream of the pressure regulator 112 back toward the set point pressure. This is done by commanding a pressure reduction from the pressure regulator 112 if an excessive off-time period has been experienced. Finally, at box 320, only the feed-forward and adaptation control terms are combined and used to control the pressure regulator 112. The feedback term is disregarded henceforth, as the signal from the pressure sensor 114 is believed to be faulty. Thus, the process loops back to the box 306, where the supply pressure and gas flow demand are again measured.

Using the adaptive methods described above, a pressure switch can be used in place of a second pressure sensor for controlling a pressure regulator in a gas storage system. The use of a pressure switch offers the opportunity for reduced cost and complexity, and even provides a level of redundancy and reduced EMI sensitivity not possible with a second pressure sensor. These benefits are possible while still providing the required diagnostic capability in controlling the pressure regulator, both in normal conditions and in case of a fault in one of the components or connections.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for controlling a pressure regulator comprising:
    a pressure sensor for providing a measurement signal quantifying a pressure downstream of the pressure regulator;
    a pressure switch for providing an off signal that indicates that the pressure downstream of the pressure regulator is above a set point pressure, or an on signal that indicates that the pressure downstream of the pressure regulator is below the set point pressure; and
    a controller responsive to the measurement signal from the pressure sensor and the signals from the pressure switch, said controller being configured to use a combination of a feedback control term, a feed-forward control term and an adaptive control term to control the pressure regulator such that the pressure downstream of the pressure regulator seeks the set point pressure and such that on-time and off-time periods of the pressure switch are balanced.

2. The system of claim 1 wherein the controller is configured to compute the feedback control term based on a difference between the set point pressure and the measurement signal from the pressure sensor.

3. The system of claim 1 wherein the controller is configured to compute the feed-forward control term based on a pressure upstream of the pressure regulator and a flow rate of a gas through the pressure regulator.

4. The system of claim 1 wherein the controller is configured to compute the adaptive control term based on a difference between the on-time and off-time periods of the pressure switch.

5. The system of claim 1 wherein the controller is also configured to detect an on-time or off-time period of the pressure switch which is greater than a predetermined threshold, and to determine from the on-time or off-time period which is greater than the predetermined threshold that the measurement signal from the pressure sensor is inaccurate.

6. The system of claim 5 wherein the controller is configured to compute the adaptive control term based on the on-time or off-time period which is greater than the predetermined threshold such that the pressure downstream of the pressure regulator returns to the set point pressure.

7. The system of claim 1 further comprising a pressure relief valve downstream of the pressure regulator, where, if the controller detects venting of the pressure relief valve, the adaptive control term is computed to reduce the pressure downstream of the pressure regulator.

8. The system of claim 1 wherein the pressure regulator, the pressure sensor, the pressure switch and the controller are used in a hydrogen storage system.

9. The system of claim 8 wherein the hydrogen storage system is used to provide hydrogen gas to an automotive fuel cell.

10. A hydrogen storage system for providing hydrogen gas to a fuel cell, said hydrogen storage system comprising:
    one or more pressure vessels for storing the hydrogen gas;
    a pressure regulator for reducing the hydrogen gas from a vessel pressure to a set point pressure;
    a first pressure sensor upstream of the pressure regulator for measuring the vessel pressure;
    a second pressure sensor for measuring a pressure downstream of the pressure regulator;
    a pressure switch for determining if the pressure downstream of the pressure regulator is above or below the set point pressure; and
    a controller responsive to signals from the first pressure sensor, the second pressure sensor and the pressure switch, said controller being configured to use a combination of a feedback control term, a feed-forward control term and an adaptive control term to control the pressure regulator such that the pressure downstream of the pressure regulator seeks the set point pressure and such that on-time and off-time periods of the pressure switch are balanced.

11. The hydrogen storage system of claim 10 wherein the feedback control term is based on a difference between the set point pressure and the signal from the second pressure sensor, the feed-forward term is based on the signal from the first pressure sensor and a flow rate of a gas through the pressure regulator, and the adaptive control term is based on a difference between the on-time and off-time periods of the pressure switch.

12. The hydrogen storage system of claim 11 wherein the controller is also configured to detect an on-time or off-time period of the pressure switch which is greater than a predetermined threshold, and to determine from the on-time or off-time period which is greater than the predetermined threshold that the signal from the second pressure sensor is inaccurate.

13. The hydrogen storage system of claim 12 wherein the controller is configured to compute the adaptive control term based on the on-time or off-time period which is greater than the predetermined threshold such that the pressure downstream of the pressure regulator returns to the set point pressure.

14. A method for controlling a pressure regulator in a gas storage system, said method comprising:
- measuring a pressure of a gas downstream of the pressure regulator;
- computing a feedback control term based on a difference between the pressure of the gas downstream of the pressure regulator and a set point pressure;
- measuring a pressure of the gas upstream of the pressure regulator and a gas flow rate demand;
- computing a feed-forward control term based on the pressure of the gas upstream of the pressure regulator and the gas flow rate demand;
- evaluating on-time and off-time periods of a pressure switch, where the off-time periods indicate that the pressure of the gas downstream of the pressure regulator is above the set point pressure and the on-time periods indicate that the pressure of the gas downstream of the pressure regulator is below the set point pressure;
- computing an adaptive control term based on a difference between the on-time and off-time periods; and
- combining and using the feedback control term, the feed-forward control term and the adaptive control term to control the pressure regulator.

15. The method of claim 14 wherein the adaptive control term is computed such that the on-time and off-time periods are balanced.

16. The method of claim 14 further comprising:
- determining if an on-time or off-time period which is greater than a predetermined threshold has been experienced;
- computing an adaptive control term which will return the pressure of the gas downstream of the pressure regulator to the set point pressure if the on-time or off-time period which is greater than the predetermined threshold has been experienced; and
- combining and using the feed-forward control term and the adaptive control term to control the pressure regulator if the on-time or off-time period which is greater than the predetermined threshold has been experienced.

17. The method of claim 16 further comprising determining that the pressure of the gas downstream of the pressure regulator which was measured is inaccurate, and setting a diagnostic trouble code in a controller.

18. The method of claim 14 further comprising determining if venting of a pressure relief valve downstream of the pressure regulator has occurred, and computing an adaptive control term which will reduce the pressure of the gas downstream of the pressure regulator if venting of the pressure relief valve downstream of the pressure regulator has occurred.

19. The method of claim 14 wherein the gas storage system is a hydrogen storage system for an automotive fuel cell.

* * * * *